United States Patent [19]

Eilert et al.

[11] Patent Number: 4,809,157
[45] Date of Patent: Feb. 28, 1989

[54] DYNAMIC ASSIGNMENT OF AFFINITY FOR VECTOR TASKS

[75] Inventors: John H. Eilert, Wappingers Falls; Jeffrey A. Frey, Highland; Yih-shin Tan, Pleasant Valley; James H. Warnes, Poughkeepsie, all of N.Y.

[73] Assignee: International Business Machines Corp., Armonk, N.Y.

[21] Appl. No.: 781,844

[22] Filed: Sep. 30, 1985

[51] Int. Cl.$^4$ .......................... G06F 9/00; G06F 9/46
[52] U.S. Cl. ................................................. 364/200
[58] Field of Search .............. 364/200, 900, 131, 132, 364/133, 138, 130

[56] References Cited

U.S. PATENT DOCUMENTS

| | | | |
|---|---|---|---|
| 4,400,769 | 8/1983 | Kaneda et al. | 364/200 |
| 4,590,555 | 5/1986 | Bourrez | 364/200 |
| 4,642,756 | 2/1987 | Sherrod | 364/200 |

OTHER PUBLICATIONS

IBM OS/VS2 MVS Overview, entitled "Dynamic Assignment of Affinity for Vector Tasks", by Eilert et al., May, 1980.
IBM TDB, vol. 16, No. 2, Jul., 1973-pp. 654-657, (p. 655, section I).
Proceedings of 5th International Conference on Distribute Computing Sys, May, 1985, pp. 310-320, (p. 315).
IBM Systems Journal, No. 1, 1974, pp. 60-87, (p. 73, 1.13-p. 74, 1.18).

Primary Examiner—Thomas M. Heckler
Assistant Examiner—Paul Kulik
Attorney, Agent, or Firm—J. A. Biela; W. B. Porter

[57] ABSTRACT

A method for dynamically assigning and removing task affinity for a resource is disclosed and claimed. A first interrupt handler recognizes a special task interrupt condition which is generated by the hardware. The interrupt condition is generated because a task attempted to execute a special instruction and either a special resource is attached to the central processing unit which issued the special instruction, or a special resource is not attached to the issuing central processing unit, but could be attached to another central processing unit in a central electronic complex. The first interrupt handler then passes control to a second interrupt handler which determines if execution of the current task can continue. If it can, the second interrupt handler creates or reestablishes a special environment and the task is dispatched (either for the first time or again) with a special dynamic affinity to only those central processing units in the central electronic complex that have a special resource attached. Due to the assignment of special affinity the task is dispatched only on a central processing unit with a special resource attached. The task can be suspended and special affinity removed because of non-use of the special resource over a predetermined period of time. Special affinity is automatically determined following a first-issued special instruction as well as one issued by a task whose special affinity was previously suspended.

6 Claims, 8 Drawing Sheets

DYNAMIC ASSIGNMENT OF AFFINITY FOR VECTOR TASKS

BACKGROUND OF THE INVENTION

1. Field of the Invention

This invention relates to the automatic assignment of task affinity to a central processing unit (CPU) having an attached vector processor (VP). More particularly, this invention relates to the giving and removing of task affinity associated with a vector processor without the knowledge or intervention of the programmer-user.

2. Prior Art

In general, an operating system, e.g. MVS, VM, running in a CPU manages multiple resources for the programmer-user. The operating system attempts to prevent user programs from utilizing a resource for any longer than is required to accomplish a given task, e.g. I/O. The operating system includes an algorithm that attempts to facilitate the management of the resources. A resource can be installed on a CPU and a task (a unit of work) can be dispatched thereon. The task, within an address space and represented by a task control block (TCB) or a service routine block (SRB), will have an affinity to the CPU that has the resource attached thereto.

An operating system includes a Supervisor Control Program (SCP) which provides the controls needed for multiprogramming, and a Dispatcher, which is a routine in the SCP, that routes control to the highest priority unit of work that is ready to execute. Dispatchable units of work are represented by task control blocks (TCB) and service request blocks (SRB). The operating system further includes a job Scheduler which requests jobs from a job entry subsystem (JES) that manages the flow of jobs (tasks), a Job/Step Timer (JST) which reports the amount of time a task uses a resource and detects the non-utilization of a resource overtime. The JST is invoked by the Dispatcher as long as the CPU timer is not damaged. A System Resource Manager (SRM) controls access to system resources. For example, SRM decides which address spaces to swap in or out and when to swap them in or out. A Memory Switch notifies the Dispatcher to switch to another address space or to start searching for work in a particular address space.

A tightly-coupled multiprocessing configuration consist of many hardware components which the operating system regards as resources. "Reconfiguration" is the process of changing the configuration of these hardware components. It involves varying system resources on-line or off-line as well as changing some control switches on the CPU's configuration control panel to establish the corresponding physical configuration.

Elements of the MVS operating system which utilizes the above features are discussed, for example, in IBM Publication GC28-0984-1 (File No. S370-34) which is entitled OS/VS2 MVS Overview and which is incorporated herein by reference.

The operating system can also provide for the dispatching of work to tightly-coupled CPUs in a central electronic complex (CEC). This is the fundamental concept of affinity work dispatching and has been implemented, for example, in those instances in which a user requires a CEC to execute programs written for a different data processing system. The CEC, or emulating system, accepts the same data, executes the same programs, and achieves the same results as the different (emulated) data processing system. The emulator, required to successfully execute the user's programs written for the emulated data processing system, is asymmetrically installed on perhaps several processors in a multi-processor (MP) environment. A user program (or task) dispatched on a CPU which has the emulator installed is assigned to the CPU by way of a program properties table (PPT) which is maintained by the system programmer and not by the user-programmer. This means that the only way to prevent work (requiring use of the emulator) from being dispatched to the CPU (having the emulator attached) is for the system programmer to change entries in the PPT in order to disconnect the emulator from the CPU on which it is installed. Use of the PPT is too restrictive and cumbersome for most users because task affinity cannot be dynamically removed (and recreated), as each unit of work is dispatched, to take advantage of the possible change in the (on-line, off-line or separate) status of the emulator, i.e. a resource, in the CEC. A CEC consists of from one to N CPUs each of which is approximately equal in execution rate.

Task affinity to the CPU having the emulator installed can only be determined (but not removed or created) by examining the CPU affinity indicator field ASCBAFFN. This indicator field is in the address space control block (ASCB) which contains the task's address space dispatching priority. CPU affinity indications in the ASCB are propagated to a TCB as it is created. The address space control block is located in the system queue area in the common area allocated from the top of virtual (main) storage.

Hitachi has a computer system that can include an integrated array processor (IAP) which can only be used if the user directly requests its use by specifying the IAP in job control language (JCL) statements. In other words, the user has to specify that vector instructions are to be used. Programmers, therefore, are required to know the system configuration and, in particular, which CPU has an IAP on-line at the time that their job will be run.

It is therefore an object of this invention to automatically assign task affinity to a CPU having an attached resource without system programmer or user-programmer intervention and knowledge of a change in affinity requirements, i.e. when vector instructions are to be used.

A further object of the invention is to avoid use of the program properties table to support usage of the resource so that the user-operator is not forced to select the CPU on which the task will be run.

An object of this invention is to manage the dynamic assignment and removal of affinity internally by the operating system at the task level.

Another object of this invention is to dynamically remove affinity following a significant period of time has elapsed during which the resource is not used.

It is an object of this invention to manage the assignment of CPU affinity for vector programs by an operating system control program at the task level without creation of new externals or usage of the program properties table.

Another object of this invention is to decrease dispatching overhead.

An object of this invention is to efficiently manage VPs so that any task requiring the use of a VP will be assigned only to a CPU having a VP attached thereto.

A further object of this invention is to obtain improved thruput by preventing CPUs without VPs attached from being idle when non-vector tasks are to be run.

SUMMARY OF THE INVENTION

A method is disclosed and claimed for dynamically assigning a task to a central processing unit only if a system resource is installed and available on that central processing unit which is part of a central electronic complex that includes central processing units, control bits and system resources. The method includes issuing a special instruction that requires use of a system resource, detecting a special instruction operation exception that is generated when the issuance of the special instruction creates an interrupt condition and when a control bit is off, automatically assigning restrictive affinity of the task which issued such an instruction to only central processing units which have a special resource installed and available, and dispatching the task on one of the central processing units to which the task was assigned restrictive affinity and turning on the control bit in the central processing unit.

DESCRIPTION OF THE PREFERRED EMBODIMENT

A vector processor (VP) is an optional hardware item that can be installed on a CPU. The VP (a system resource) is usually configured on-line or off-line with the CPU, but it can also be configured separately from its related CPU. The VP includes a vector status register, a vector activity count, vector registers and a vector mask register (collectively referred to herein as vector registers). The VP also provides a set of "vector" instructions (special instructions) that perform some vector-processing functions much faster than the repetitive execution of instructions from the normal 370 or 370/XA instruction set.

U.S. Pat. No. 4,400,770 (Chan et al) assigned to IBM shows four central processors in a multiprocessing configuration. A VP could be configured on-line with one, two, three or all four central processors. The VP would be connected to the IE unit (as well as to the execution unit) of a central processor in the multiprocessing configuration. The patent is incorporated herein by reference.

Vector Control Bit

In both the IBM System 370-XA and System 370 modes, vector operations are governed by a vector control bit. This bit controls access to the VP.

When the VP is installed and available on a CPU, VP instructions can be executed, but only if bit 14 of control register 0 (CR0) is one. Bit 14 of CR0 is the vector control bit. If the CPU attempts to execute a vector instruction when the vector control bit is zero, a vector operation exception is recognized.

When the vector facility is not installed or not available on this CPU, but is installed on any other CPU which is or can be placed in the CEC, an attempt to execute a VP instruction causes a vector operation exception.

A VP, though installed, is considered "not available" when it is not in the CEC, when it is in certain maintenance modes, or when its power is off. Not all CPUs in a CEC will have a VP attached so that the CPUs in such a CEC are said to be asymmetric.

The operating system can use bit 14 of CR0 to defer enabling of the CPU (with VP attached) for vector operations and to delay allocation of a vector save area until a task attempts to use the VP by issuing its first vector instruction. (This is important because the vector save area, which can be huge and which resides in fixed virtual storage, does not have to be allocated for tasks that do not execute vector instructions). Since the resulting vector operation exception nullifies the operation, the instruction address does not need to be adjusted in order to resume the task.

Vector Operation Exception

A vector operation exception (special instruction operation exception) is recognized when a vector instruction is issued, while bit 14 of the CR0 is zero, on a CPU which has the VP installed and available. The vector operation exception is also recognized when a vector instruction is issued and the VP is not installed or not available on this CPU, but the VP can be made available to the program (task) either on this CPU or on another CPU in the CEC. The operation is nullified when the vector operation exception is recognized.

Figure 1A:
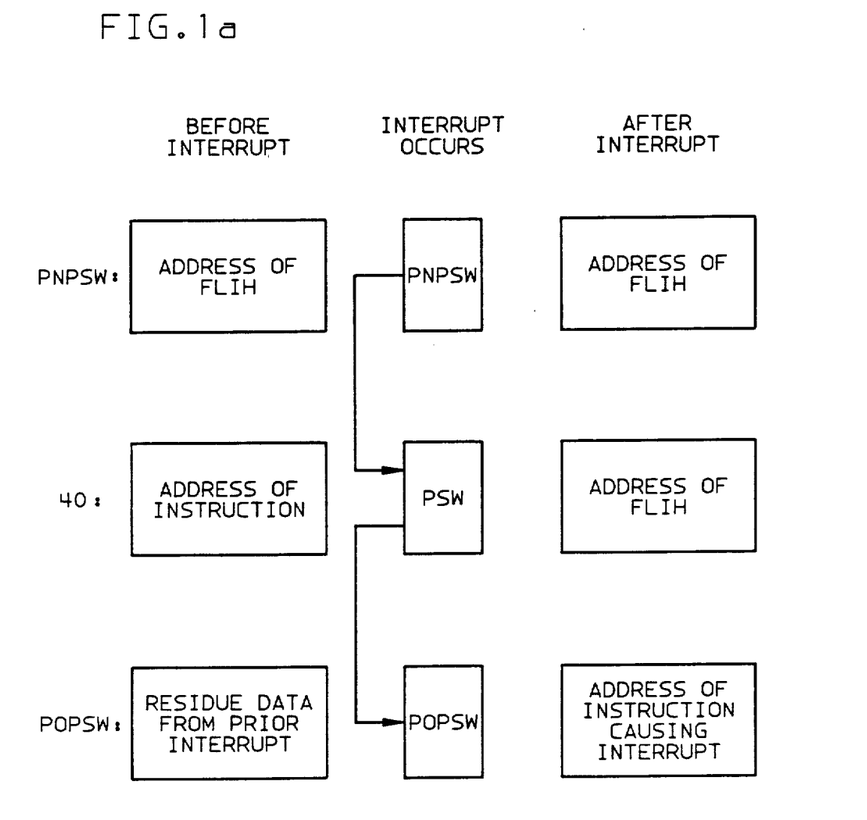
FIG. 1a, is a block diagram showing the occurrence of a vector operation exception.
Figure 5:
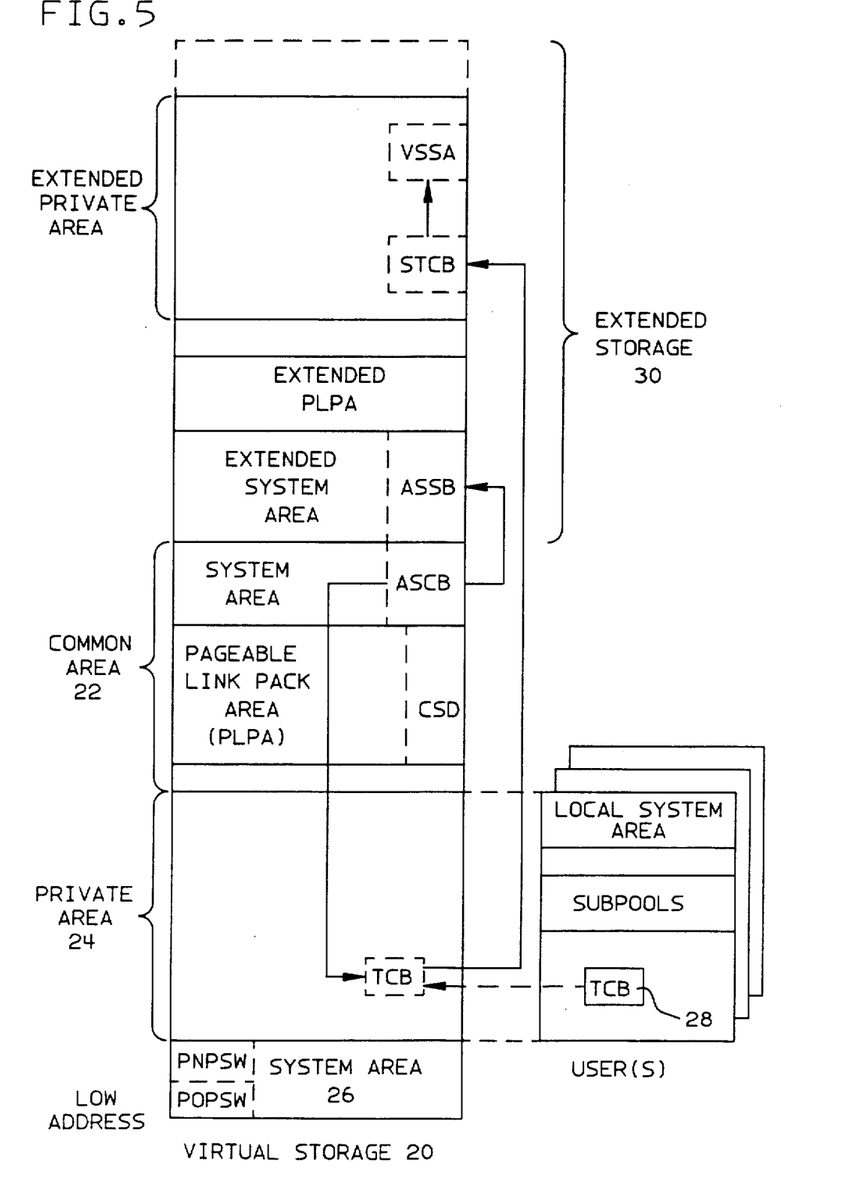
FIG. 5 is a block diagram of virtual storage showing the locations of pertinent storage areas and control blocks.

As shown in FIG. 1a, when a special instruction operation exception occurs, the CPU hardware saves the content of current program status word (PSW) 40 in the program old PSW (POPSW) in system area 26 (also shown in FIG. 5). Then the content of current PSW 40 is loaded with the content of the program new PSW (PNPSW) also in system area 26 (also shown in FIG. 5). The PNPSW is pre-set by the operating system to point to an interrupt handler (the first level interrupt handler which is discussed below). Therefore, when a task running on a CPU (with the vector control bit set to zero) issues a vector instruction, a vector operation exception interrupt occurs (PIC X '19' discussed below). The CPU hardware saves the current PSW (which is the address of the vector instruction which caused the interrupt), and loads PSW 40 with the PNPSW which addresses the first instruction in the first level interrupt handler that now receives control.

Assigning and Removing Affinity - General

For a program to execute even one vector instruction, it must be running on (assigned to) a CPU with a VP attached. Such a program (task) will not necessarily be dispatched on the correct CPU unless the task is assigned to a CPU having a VP when the instruction (step or operation) is initiated. When an attempt is made to execute the first vector instruction in a task, that task is characterized as a VP task and is automatically assigned affinity to all currently active or on-line CPUs that have a VP installed. When the task becomes ready, it may be dispatched on any CPU (in the partition) that has a VP that is attached. If the task does not use the VP attached to the CPU on which it was dispatched for a predetermined amount of time (e.g. 50 milliseconds) while the task is being executed in the CPU, the task affinity to the CPU (having the VP on-line to the operating system) is automatically removed. This dynamic assigning and removing of CPU affinity for tasks decreases the dispatching overhead associated with prior affinity dispatching since the Dispatcher is not required to skip over the task that no longer requires VP affinity. In other words, the task (without VP affinity) can now be executed in any CPU in the CEC. (Also, when a task no longer requires VP affinity, the Dispatcher runs more efficiently because the Dispatcher is not required to restore the vector registers and does not run special (status) SAVE CHANGED vector register instructions when the non-vector task is executed in a CPU that does not have an attached VP.) The vector environment is managed by the Dispatcher at the task, i.e. TCB, level instead of at the request block level.

When a task within an address space requires affinity to the VP attached to a CPU, a field (ASSBVAFN) in the address space secondary block (ASSB) is incremented to indicate the unique affinity. If the ASSB-VAFN is zero then there is no unique affinity to a VP attached to a CPU. (In this case, affinity is determined by examining ASCBAFFN.) The CEC does not use the PPT to assign tasks (requiring a VP) to CPUs with VPs since use of the PPT provides for a general affinity designation which does not specify the need for a VP as the cause of the affinity. If the PPT is used to designate CPU affinity, the entire CPU would have to be made unavailable for job scheduling in order to prevent the scheduling of a task that had vector instructions.

Task Recognition

A task must be recognized as one requiring a CPU with an attached VP. The program check first level interrupt handler (FLIH) will recognize a VP-required task interrupt condition (Program Interrupt Code) PIC X '19' which is generated by the hardware. (The FLIH is substantially an ordinary interrupt handler that has been modified to point to the second level interrupt handler which is discussed below.) The PIC X '19' interrupt, which is be treated as a vector operation exception, means that a task currently under execution attempted to execute one of the valid vector instructions (op codes) while the vector control bit was off (zero). The program status word is not updated and the vector operation is nullified. (The vector control bit is used to indicate, when set to 1 (on), that there is authorization to issue vector instructions.) The PIC X '19' interrupt can also occur when a vector instruction is issued but a VP is not installed or available on the issuing CPU, although VP hardware could be available on another CPU in the CEC. The FLIH initially recognizes this interrupt (receives control from the new Program Status Word (PSW)) and then passes control to (calls) a second level interrupt handler (SLIH) which determines if execution of the current task can continue. If it can, the SLIH (or vector handler) creates or reestablishes the vector environment and the task is dispatched (either for the first time or again) with a dynamically computed affinity to only those CPUs in the CEC that have an attached VP. Due to the assignment of special affinity, the task is dispatched only on a CPU with a VP attached. (In other words, the SLIH can handle the first-issued vector operation as well as one issued by a task whose vector affinity was previously suspended.) Only waiting or active CPUs with an attached VP will be considered for the Memory Switch Interface in the extended nucleus if a task, within an address space, is identified (due to vector interrupt PIC X '19') as a vector task and bit fourteen of CR0 is set to one.

When the Memory Switch Interface in the Supervisor Control (SC) program has to find a waiting CPU with a VP in the CEC, it uses a sixteen bit mask (field CSDCPUVF in the Common System Data (CSD) area) to identify the on-line CPUs that have a VP attached to which the task has affinity. (The CSDCPUVF mask is set during configuration or reconfiguration of the hardware components, e.g. VPs.) Each bit in the CSDCPUVF represents a CPU in the CEC. A bit in the CSDCPUVF is set to one (on) when the corresponding CPU has a VP attached thereto (on-line). If there are no WAITing CPUs with attached VPs, the Memory Switch will examine the PSAANEW field of all on-line CPUs with attached VPs to determine if any VP is an eligible target (if any PSAANEW was updated) for the Memory Switch. (The PSAANEW field points to the Address Space Control Block (ASCB) of the task. The Dispatcher will get control of the CPU whose PSAA-NEW field was updated.) If the CSDCPUVF mask indicates that there are no on-line VPs in the CEC, the Memory Switch will return to its caller without performing any function. The Dispatcher will then skip over the task. (In the latter case, another routine called the System Resource Manager (SRM) determines that the skipped task is not being serviced. The SRM then either cancels the task or "swaps out" the task to extended storage and notifies the user-operator to bring a VP on-line. Once the VP is brought on-line and the task dispatched, the interrupt handler will automatically handle it in the manner described above when the vector operation is re-executed. The Scheduler routine cannot determine whether an instruction will use a VP and therefore has no basis for checking an instruction (job step) against the availability of a VP. If bit one of general register 0 is set to one, only on-line VPs to which the task has affinity are eligible for the Memory Switch. This bit is the interface to the Memory Switch. It indicates that only VPs are to be used.)

The task's original (less restrictive) affinity, prior to the occurrence of the vector interrupt, is saved in a secondary task control block (STCB) field STCBAFNS. Several predetermined bits in an STCBVAFN field in the STCB contain the logical ID of the CPU with a VP attached on which the task was last dispatched, and indicate that the task currently has affinity to the VP. In this case, VP status is preserved in the hardware vector registers when the STCBVAFN field contains the "logical" processor ID of the current CPU. (When the STCBVAFN field is zero, the task is not currently using a VP and the Dispatcher will not load vector status for that task because there was no authorization to use a VP. In this case, vector status is preserved in the vector status save area (VSSA).) The STCB is provided to allow task related (affinity and status) information to be maintained in a save area in virtual storage above sixteen megabytes. The STCB is obtained from a subpool in extended virtual storage and chained to the TCB. The processor ID in the STCBVAFN field is used by status saving routines to insure that the current processor is a CPU with a VP attached, and is the CPU upon which the task was last dispatched. The STCBVAFN field contains three types of information:

1. The X'40' bit plus bits four through seven represent a static logical CPU ID. This indicates that the task currently has affinity to a VP and was last dispatched on a CPU with an attached VP indicated by the ID. (If the X'40' bit plus bits four through seven are zero, the task is not currently using the VP or may never have used the VP. If the task used the VP (issued a vector instruction), the vector status is present in the VSSA. Therefore, the VSSA will be examined to determine whether the task ever used the VP.)

2. The X'80' bit is set to one (on) when vector status (hardware related data) is lost due to a machine check or when the VP is taken off-line before the vector registers were saved. (An alternate CPU recovery condition.)

3. The X '20' bit is set to one (on) when the task's vector status (task's vector environment) is saved in the VSSA. (If the X '20' bit is zero (off) and a CPU ID is present in the field, the task's vector status is present in the hardware vector registers, e.g. the vector status register (VSR). When this bit is on, the Dispatcher will reload vector status since the bit indicates that the task has VP affinity.)

A full-word count (ASSBVAFN), in the Address Space Secondary Block (ASSB) in extended storage, is tested to determine the number of VP-dependent tasks in an address space. If ASSBVAFN is zero then there are no tasks requiring a VP. Otherwise, if ASSBVAFN is non-zero, at least one task is running within the associated address space having a unique affinity to a VP. (The ASSBVAFN is incremented by SLIH at the occurrence of PIC X '19', and is decremented each time a vector task is DETACHed. This insures that the count of vector tasks is managed dynamically and efficiently since the Time Sharing Option (TSO) and Scheduler dependency is eliminated.) There is one ASSBVAFN field for each address space.

Affinity Value

The affinity value field for the task, TCBAFFN, is initially obtained from the regular address space affinity indicator, ASCBAFFN, when the task is created at ATTACH time. This value is saved in STCBAFNS by the vector SLIH. Each of the sixteen bits in the TCBAFFN field represents a CPU in the CEC on which work can be dispatched. The affinity requirement, i.e. the TCBAFFN value, of a vector task is updated at each dispatch by ANDing the STCBAFNS field with the mask field CSDCPUVF in the CSD which indicates (reflects) all of the waiting and active CPU's that are available for VP job steps, and storing the result into TCBAFFN. This will detect the possible changes in the status of available VP hardware in the CEC. That is, a VP processor may have come on-line (or detached) since the last task preemption. Therefore, the affinity checks at each dispatch determine whether additional VP-capable CPUs were brought on-line or removed since the last dispatch. The Dispatcher is capable of switching back and forth between the non-affinity dispatching path and the affinity (mainline) dispatching path in response to each affinity check. At dispatch time, each task (unit of work) has its hardware state (normal registers) restored to the CPU. For vector tasks, the restored hardware state (status) includes control bit 14 of CR0 (set to one) and the vector registers as well as the normal register set.

Figure 1B:
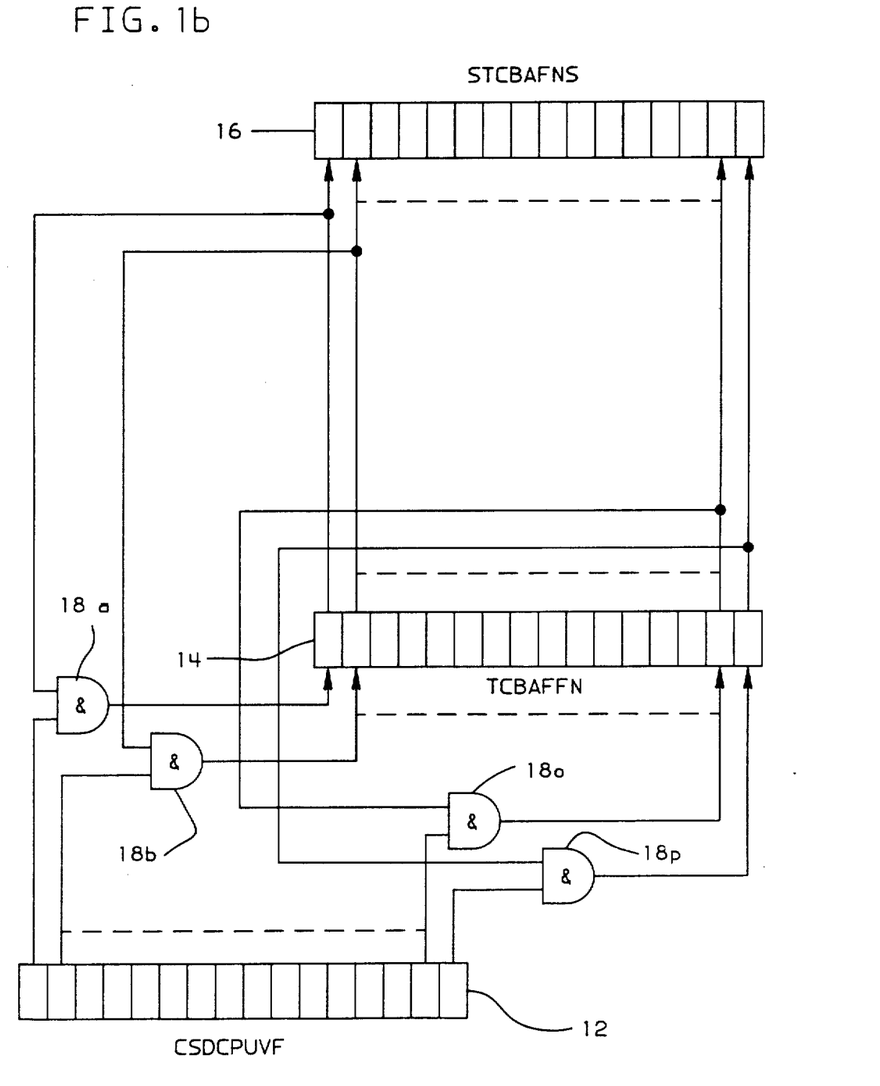
FIG. 1b is a block diagram showing the setting of VP task affinity.

FIG. 1b is a block diagram showing how VP affinity is set.

The sixteen bit CSDCPUVF field 12, in the CSD, has the same format as the sixteen bit TCBAFFN field 14. If TCBAFFN is X '0000' (which means that the task is eligible to run on all CPUs in the CEC), its content is changed to X 'FFFF'. In any case, the content of the TCBAFFN field is moved to (saved in) the Secondary TCB field (STCBAFNS) 16. The content of TCBAFFN is now ANDed (using AND GATES 18a-p) with the content of the CSDCPUVF field and the result is saved in the TCBAFFN field. The result in TCBAFFN is the task's new (VP) affinity. The task is now only eligible to run on CPUs, identified by the value in TCBAFFN, which have VPs attached thereto.

Figure 2:
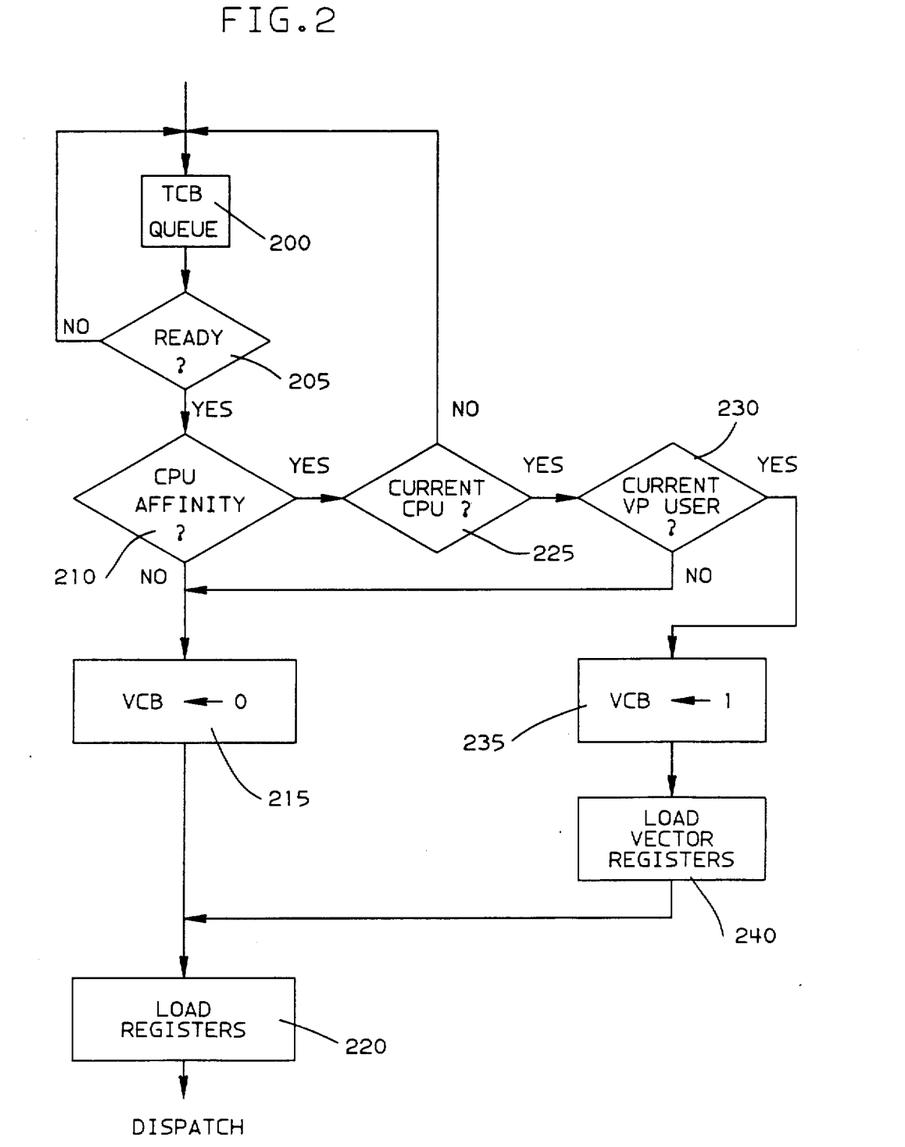
FIG. 2 is a block diagram showing how a task is dispatched.

FIG. 2 is a block diagram showing how the Dispatcher dispatches a (vector or non-vector) task.

At block 200, the Dispatcher scans the queue of in-storage users (TCBs) looking for work. If the user's task is unable to execute (not ready), as determined at decision block 205, the Dispatcher will continue to search the queue. If the task is ready, the Dispatcher determines if the ready TCB (task) has affinity to an eligible CPU at decision block 210. (As stated herein, eligible CPUs are represented by the TCBAFFN field. A TCBAFFN value of X '0000' or X 'FFFF' indicates that the ready TCB does not have affinity. The task can be executed on any CPU.) If the TCB does not have affinity, the Dispatcher loads the control, general and floating point registers at block 220 and the task is then dispatched. The vector control bit (VCB) 14 in CR0 is set to zero at block 215 indicating that the ready TCB did not execute vector instructions. If the TCB has affinity, the operating system will determine, at block 225, if the TCB can be dispatched on the current CPU. If the TCB cannot be dispatched on the current CPU, the task will be skipped and the Dispatcher will continue to scan the TCB queue. If the TCB can be dispatched on the current CPU, the Dispatcher will then determine if the task is a current VP user (VSSA already created) at decision block 230. If the TCB is not a current VP user (as indicated by field STCBVAFN), the task is dispatched on the current CPU as a TCB without affinity. If the TCB is currently authorized to use the VP (as indicated by field STCBVAFN) and the current CPU has a VP (as determined at decision block 230), then the Dispatcher sets the vector control bit to one at block 235, and loads the vector registers (block 240) associated with this TCB. This allows the task to execute vector instructions. The Dispatcher then loads the general purpose and floating point registers (at block 220) and dispatches the task (passes control to the user). (If the TCB is a current VP user but the current CPU does not have a VP, the task is bypassed and the affinity bit in TCBAFFN associated with this CPU is set to zero.)

In view of the above discussion, it is clear that thruput is increased since only those tasks actually needing the VP (a limited resource) at the time of dispatch are given that resource. If a task has not used the VP for a "long" time, the task will have its vector affinity requirements removed, and will no longer be dispatched as a vector task when the vector control bit is turned on. The task, now having less-restrictive affinity, will then be dispatched on any CPU in the CEC so as not to tie up a critical (VP) resource. (A "long" time is evaluated by use of a vector activity count clock which is implemented to determine the amount of time that vector instructions are executed. If, after 50 milliseconds have elapsed since the last issued vector instruction (as measured by the CPU timer), no other vector instruction is issued (as determined by the vector activity count clock), vector affinity requirements, for this task, are automatically removed.)

Also in view of the above discussion, it is clear that the operating system, e.g. MVS, will automatically assign affinity to the CPU with a VP. It is unnecessary for programmers to know the system configuration, i.e. which CPU has a VP on-line to the operating system at the time their job will run. Furthermore, the operating system will automatically remove affinity to the CPU with a VP if the task does not use the VP for a predetermined period of time. This is a queueing benefit in that the CPU with the attached VP will not be overloaded with tasks not needing the VP functions. (That is, tasks that do not require a VP can run on any CPU.) For example, if the task is no longer issuing vector instructions (VP no longer needed), less-restrictive task affinity (the saved affinity) will be restored because of the non-use of the VP. (In other words, the CPU on which the task was previously dispatched saved the task's original, less-restrictive affinity in the STCBAFNS when a PIC X '19' occurred and a vector operation was issued.) Now, when the vector authority is suspended because of non-use, the original saved (less-restrictive) affinity will be restored. If subsequent use is to be made of the VP, another PIC X '19' will occur causing the SLIH to restore the vector environment. This dynamic assignment and removal of affinity decreases the dispatching overhead generally associated with affinity dispatching since the Dispatcher on a CPU without a VP may have to skip over fewer tasks that do require restrictive VP affinity. Also, dispatching overhead is decreased because the task (having less restrictive affinity) does not require any vector status to be saved and restored.

Processing a Vector Operation Exception Interrupt

To process a vector operation exception interrupt, vector SLIH is entered at entry point IEAVEVS by the program FLIH in the cross memory environment that was active when the vector exception (PIC X '19') was generated. A return code of X'0' in register 15 indicates that the task will be dispatched (or redispatched via a load program status word (LPSW) by the program FLIH) since the vector environment has been created or restored. (This occurs when a vector exception is encountered on a CPU that has a VP attached which the task can use.) A return code of X '04' indicates that the vector exception occurred on a CPU without a VP attached, but that the vector SLIH has initiated an SRB to create the vector environment. A return code of X '08' generally means that the vector SLIH was unsuccessful in setting up the vector environment for the interrupted task.

A conditional request for the local lock is made. Once the local lock is obtained the vector SLIH will compute the size of the vector save area (vector section size or number of element locations in a vector register times 64) plus the area for the vector status register and the!-vector mask register. (If the local lock is not obtained, the task is suspended and an SRB is scheduled to run on a CPU with a VP attached to create the task's vector environment.) The save area storage (VSSA) will be created (obtained), initialized to zero and pointed to by field STCBVSSA. SLIH will create the vector environment because STCBVSSA (the pointer to VSSA) will initially be zero indicating that no VSSA had been previously created. The task's original (less restrictive) CPU affinity (found in field TCBAFFN) will be saved in field STCBAFNS and field TCBAFFN will contain a new more restrictive (non-zero) affinity to VP. If SLIH determines that the task can be redispatched by program FLIH, the STCBVAFN field will be set to the logical CPU ID. If SLIH determines that the task can't be dispatched, the field STCBVAFN will be cleared. (Note: the Dispatcher will calculate the new affinity value (TCBAFFN) by ANDing the content of the STCBAFNS field with the content of the CSDCPUVF field.) The ASSBVAFN field (in ASSB) is incremented to indicate that the task requires the unique affinity to VP hardware attached to a CPU. While SLIH is being executed, the Dispatcher lock is held to insure the integrity of ASSBVAFN so that a VP will not be taken off-line before the task has a chance to claim affinity to it. (Once the vector task is completed, ASSBVAFN is decremented by task management (DETACHED) to insure that the count of vector tasks is managed dynamically and efficiently.) The vector SLIH then determines if the task was running on a CPU with a VP attached, i.e. if the current CPU meets the task's restrictive affinity requirements. If the VP is attached to the current CPU, i.e. if the task has affinity to the current CPU, bit 14 of CR0 will be set to one, the logical CPU ID will be stored in field STCBVAFN, the vector registers and the vector status and mask registers from VSSA will be loaded, and a return code of X'0' will be returned to the FLIH (to register 15). The code indicates that the vector environment was successfully set up, and the CPU on which the task was running did have an attached VP. The task then continues. (If the current CPU does not meet the task's restrictive affinity requirements, the program status word, registers and cross memory status are saved, and control is returned to FLIH with a return code of X '04'. The task is pre-empted.)

Figure 3:
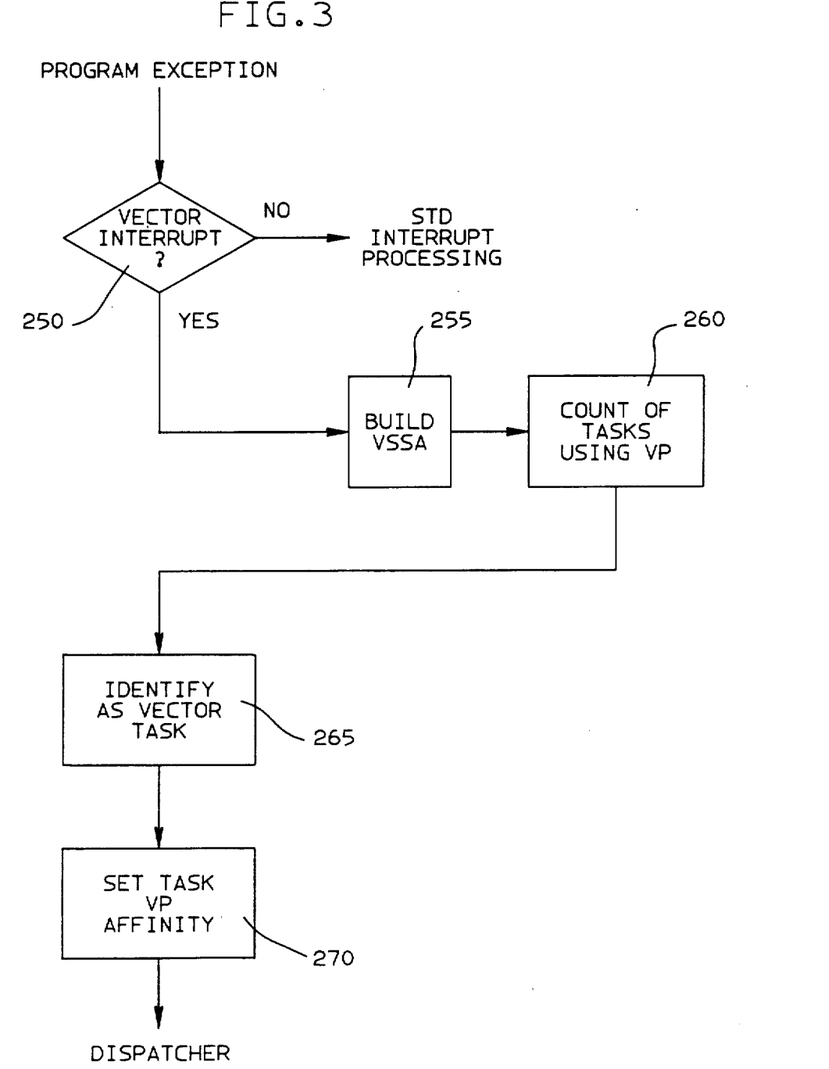
FIG. 3 is a block diagram showing how a task becomes eligible to issue VP instructions.

FIG. 3 is a block diagram showing how a task becomes eligible to issue, for the first time, vector instructions. (Initially, vector control bit 14 in CR0 is zero indicating that the user has never had access to a VP and has never been authorized to issue vector instructions.)

When the task first issues a vector instruction, a program exception (PIC X '19') is determined to occur at decision block 250. The operating system:

1. allocates and initializes the VSSA at block 255. (The VSSA holds the task's vector registers-vector status - across dispatches.)

2. increments the count of the number of tasks in the address space using the VP (at block 260). (The count is kept in the ASSBVAFN field.)

3. sets field STCBVAFN to indicate that this is a vector task requiring VP affinity (at block 265).

4. sets the task's (more restrictive) vector affinity (in TCBAFFN) to ensure that the TCB is only dispatched on CPUs that have VPs attached (at block 270).

Control then passes to the Dispatcher. If the current CPU does not have a VP, the task will remain on the queue until selected by a CPU having a VP. If the current CPU has a VP, the interrupted task will resume execution.

The vector environment is recreated (restored) if the interrupted task, which has had vector affinity removed/reset because of non-use of the VP over a predetermined period of time, now issues additional vector instructions and, each time, incurs a vector exception (PIC X '19'). The need to recreate the vector environment is detected by examining the STCBVSSA field to determine whether a VSSA had been created, i.e. that STCBVSSA is non-zero. Vector SLIH insures that the STCB pointer to the VSSA points to valid storage, i.e. insuring the validity of the VSSA. The vector SLIH determines if the previously interrupted task is now running on a CPU with a VP attached. If it is, the task's original affinity (found in field TCBAFFN) is saved in field STCBAFNS and field TCBAFFN will contain a more restrictive (non-zero) affinity. A new affinity value is computed by ANDing the content of the STCBAFNS field with the content of the CSDCPUVF field. The result is stored in the TCBAFFN field. If the task has affinity to the current CPU, bit 14 of CR0 will be set (to one), the STCBVAFN (which was zero) will be set to the logical CPU ID, and the task's vector environment status will be restored. Control will be returned to the FLIH, with a return code of X'0' in register 15, indicating that the interrupted task is to continue. If the task is not now running on a CPU with a VP attached, vector SLIH will determine if a CPU with an attached VP is available in the CEC. If the task is not running on a CPU with an attached VP, current (original) CPU affinity will be saved in field STCBAFNS. A new affinity value (TCBAFFN) is computed by ANDing fields TCBAFFN and CSDCPUVF. Control will be returned to the FLIH with return code X'04' indicating that the task is to be pre-empted. (In general code X'04' indicates pre-emption which means that the current task will be suspended and the Dispatcher will search for another task to dispatch. When STCBVAFN is zero indicating that there was no authorization to use the VP, the Dispatcher will give control to (dispatch) a non-vector task. Pre-emption occurs when either the current CPU is not eligible for vector work because the current CPU did not meet the task's new affinity requirements or the vector SLIH suspended the interrupted task and scheduled an SRB to attempt to create the vector environment. No vector status is saved when a vector task is pre-empted and STCBVAFN is zero.)

Creation of Vector Environment with SRB

The SRB routine, scheduled by the vector SLIH to create the vector environment due to the immediate unavailability of the address space's local lock, will also create the vector environment. The SRB routine computes the size of the vector save area (VSSA) and allocates storage (fields) for the vector mask register, vector status register and the vector section size. Once the SRB is scheduled, control is passed back to FLIH with return code X'04'.

Affinity Checks

After task addressability has been established, the TCBAFFN field is examined by the Dispatcher. If TCBAFFN contains X 'FFFF', the associated task does not have special affinity requirements and the Dispatcher continues on the non-affinity dispatching path. (The non-affinity dispatching path does not require the overhead of affinity checks and therefore increases the performance of the CPU.) If the TCBAFFN field is not X 'FFFF', then special affinity requirements may exist and an off-line affinity checking path performs the following:

1. If TCBAFFN is zero, control is passed to the standard mainline Dispatcher path in which non-affinity dispatching occurs.

2a. If TCBAFFN is non-zero, the new STCBVAFN field is examined to determine if the task has affinity to a CPU with a VP attached. (If STCBVAFN contains zero, the VP affinity requirements are recomputed to identify additional CPUs with VPs attached that were brought on-line since the last dispatch. The field TCBAFFN now contains the result of ANDing STCBAFNS and CSDCPUVF.)

2b. The TCBAFFN value is then ANDed with the physical CPU address mask (PCCACAFM) to determine whether the current CPU is eligible for the dispatch of the vector task. If the result is non-zero, the task has affinity to the current CPU and control is passed back to the mainline Dispatcher path where dispatch can continue. (That is, JST invoked PSAANEW of the current CPU is set (updated) to the ASCB address of the task's home address space (currently executing CPU) and control is given to the specified task (TCB).) If the result is zero, the task cannot be dispatched on the current CPU. A check is then made to determine if the task can run on some other CPU in the CEC. The check is made by ANDing the TCBAFFN value with the mask representing currently active on-line processors (CSDCPUAL). If the result is non-zero, the task has affinity to another CPU. In this latter case, the next task on the dispatching chain is retrieved and processing continues from a mainline task path in the Dispatcher. If the result is zero, there are no active processors which meet the affinity requirements specified by the task. When this is the case STCBVAFN, which contains the vector affinity indicator bits, is examined.

If STCBVAFN indicates no vector affinity (STCBVAFN=0), the Dispatcher skips over the task. (The SRM determines that the skipped task is not being serviced. The SRM then either cancels the task or "swaps out" the task to real storage and notifies the user-operator to bring a VP on-line. Once the VP is brought on-line, the program FLIH will handle it in the manner described above.)

Removal of Restrictive Affinity

As indicated by the above example, a task has affinity to a CPU with a VP attached because it performs a significant amount of vector instructions. Restrictive vector affinity is assigned to the task. However, once all vector computations are complete, the remainder of the task may simply print out reports. While the task prints out reports, the task no longer needs restrictive (vector) affinity assigned to it. Instead, less-restrictive task affinity is reinstated by the Dispatcher through the Job Step Timer (JST) so that the task could potentially finish faster. In other words, the task having less-restrictive affinity can now run on any CPU and does not have to wait for a CPU with a VP attached. (The JST is invoked when status is being saved.) The Dispatcher insures that the task's affinity requirements are managed more dynamically and efficiently. Generally, less-restrictive affinity is reinstated when the vector activity count clock (a field in the VSSA) is zero. The SCP provides for a constant (50 msec) to be used to determine if the task has run a sufficient amount of time in order to determine if an analysis of vector usage can be made. When less-restrictive affinity is reinstated, the content of TCBAFFN is replaced by the content of STCBAFNS and the task is no longer identified as an active vector task (STCBVAFN equals zero). The vector control bit is also set to zero. This could be a temporary suspension of vector affinity. In the event that the task issues vector instructions again, the active vector environment will be re-established by vector SLIH. The benefits of dynamic removal of affinity (as well as dynamic assignment of affinity) are lost if all CPUs in a CEC have VPs attached.

Example Summary

1. Task has vector affinity;
2. All vector computations are complete and remainder of program simply prints out records such that there is no longer any need for restrictive vector affinity;
3. Vector activity count clock (a field in ASSB representing VP usage) is interrogated and found to be zero and 50 milliseconds of CPU time has elapsed; and
4. Less restrictive task affinity is reinstated since the VP is no longer (at the moment) needed.

Vector SLIH

Figure 4A:
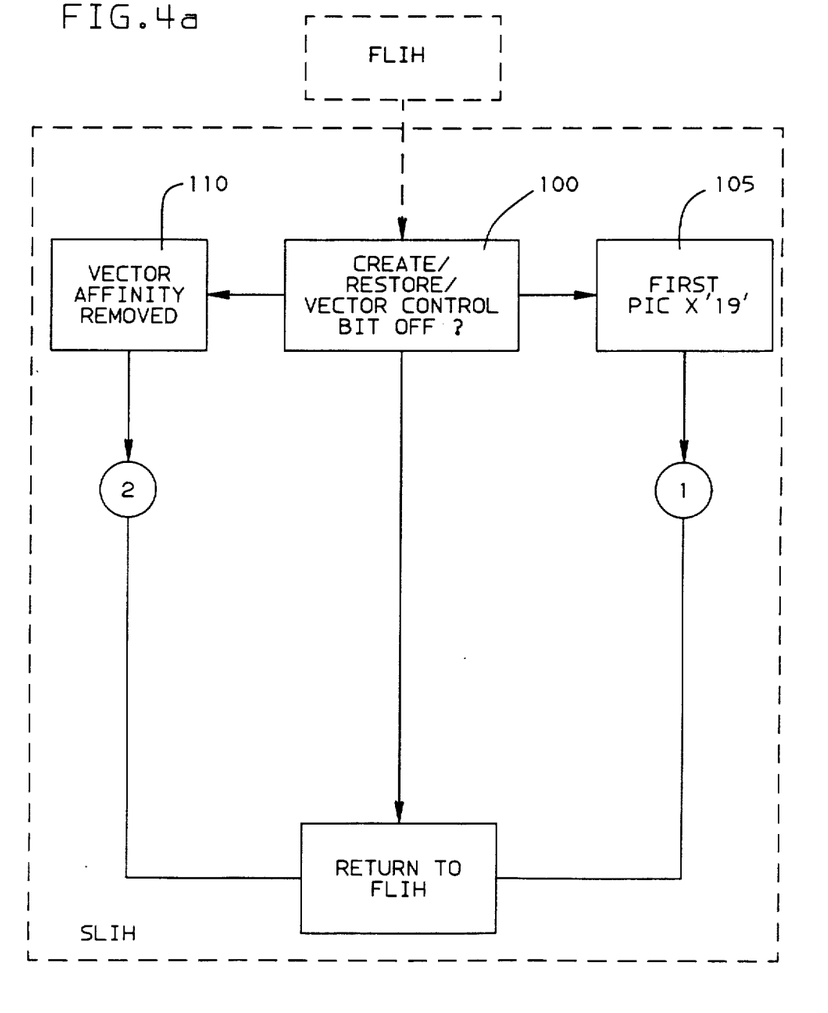
FIG. 4a-c are block diagrams showing the operation of creating or restoring the vector environment for a task issuing vector instructions.
Figure 4B:
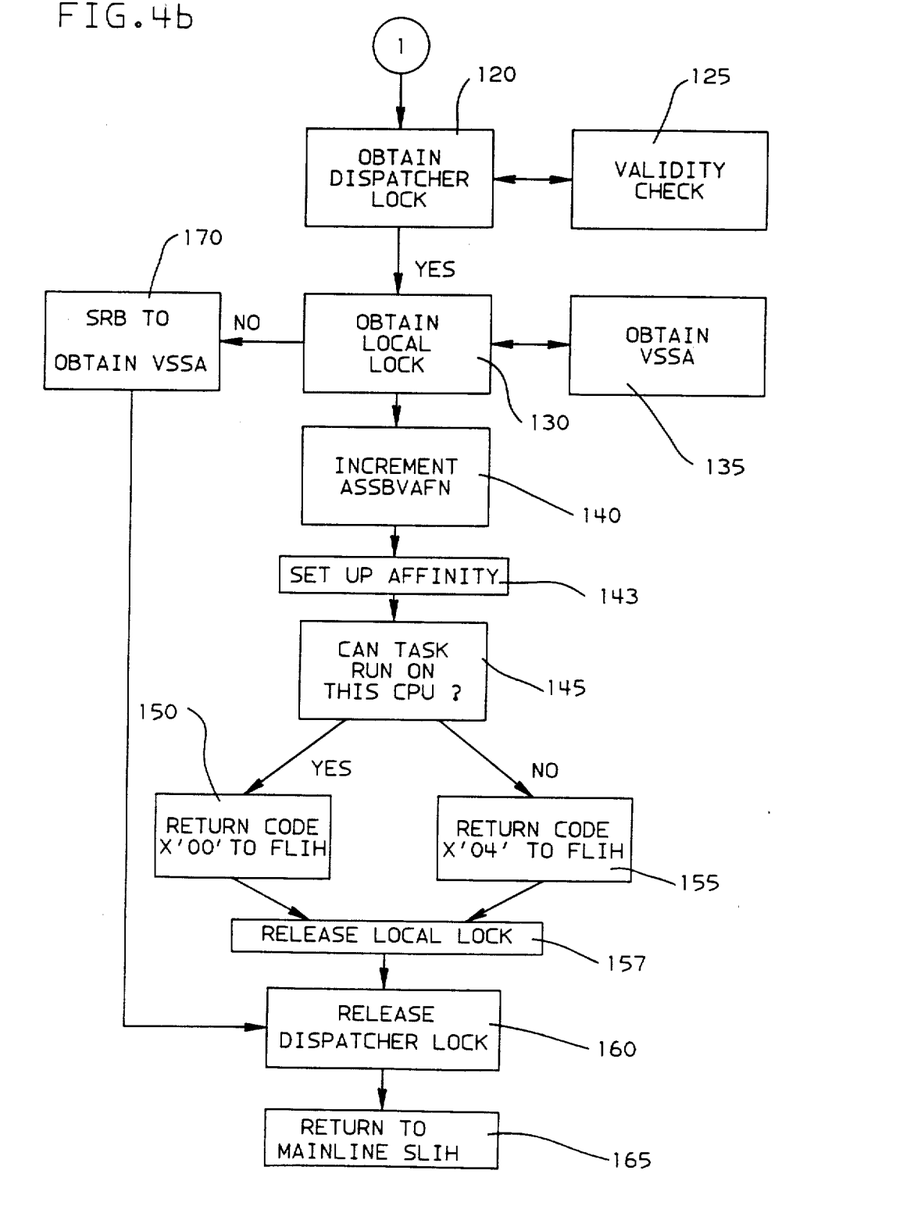
Figure 4C:
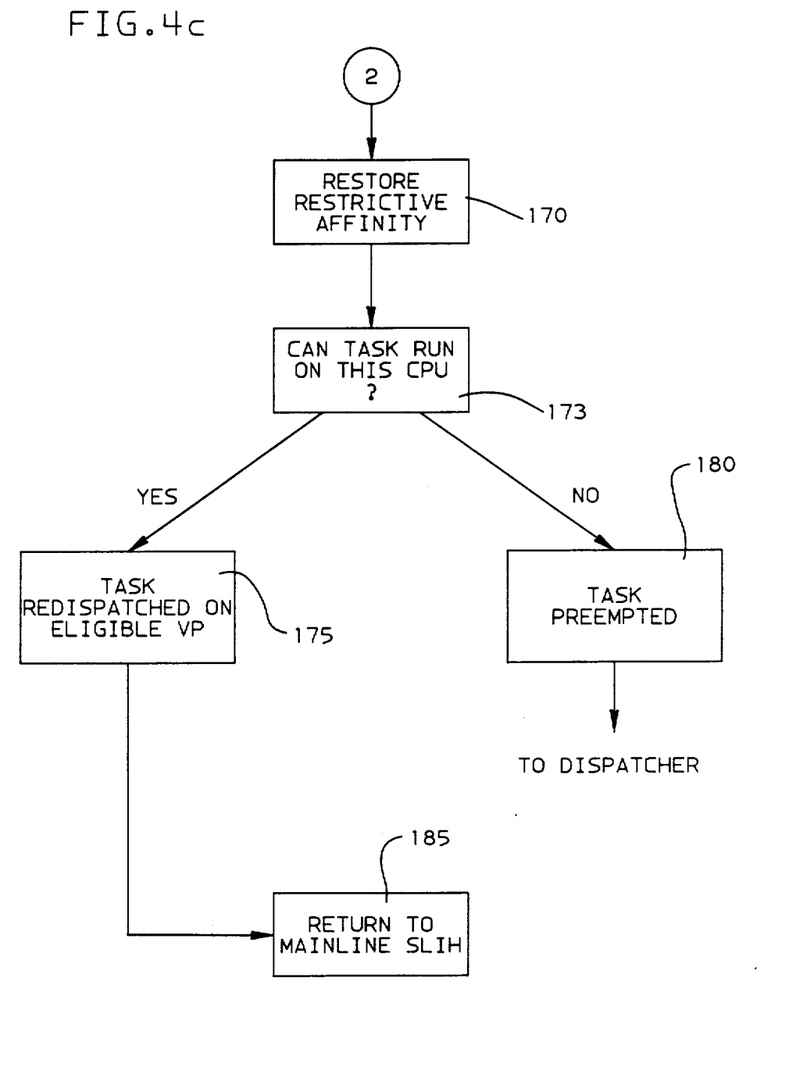

The vector SLIH receives control from the program FLIH upon detection of a vector interrupt (PIC X'19'). The SLIH is responsible for the creation and restoration of the vector environment of a task issuing vector instructions. The logic diagram that describes the operation of SLIH is shown in FIGS. 4a–c.

At block 100 (FIG. 4a), a decision is made as to the type of work that should be done. Specifically, either the vector environment has to be created or it has to be restored (because the environment was removed because of non-use) or the vector control bit has to be turned on.

At block 105, if the first vector interrupt (PIC X'19') is encountered (which is detected by a null pointer to the VSSA), then the vector environment will be created (beginning at step 1).

At block 110, if the vector affinity was removed (which is detected when the VSSA exists but STCBVAFN is zero), then the vector environment will be restored (beginning at step 2).

In FIG. 4b, the vector environment is created for the first time. At block 120 the Dispatcher lock is obtained. This prevents taking a VP off-line while a check is made for all on-line VPs and while ASSBVAFN (which indicates if there is at least one task that has affinity to a VP) is manipulated. (The Dispatcher lock also serializes the vector SLIH and the SRB routine.)

At block 125, a validity check is made to ensure that a VP exists (that at least one on-line VP is enabled to which the task has affinity) and that the task is unlocked. The field TCBAFFN indicates all on-line VPs to which the task has affinity. If TCBAFFN is zero, the task has affinity to all on-line CPUs (no VPs are on-line). If the issuing task is disabled, or no VP exists or no on-line VPs meet the task's affinity requirements, then the program FLIH is instructed to terminate the task.

At block 130 (if the issuing task is not terminated), the local lock will be obtained so that TCB and STCB fields can be manipulated. The local lock is obtained when the return code to register 15 is X'0'.

At block 135, the VSSA is obtained (computed and initialized). At this point, the section size field is initialized, the pointer to the vector register save area is set and the VSSA is chained to the STCB. The unused storage at the beginning of the VSSA becomes free.

At block 140 (if VSSA was successfully obtained), the ASSBVAFN field is incremented indicating that there exists at least one task in this address space which has affinity to a VP. The tasks original (less restrictive) affinity is saved in STCBAFNS and a (more) restrictive affinity (a value that is non-zero and not all ones) is set up in TCBAFFN. VP affinity is set up at block 143 in the manner described above.

At block 145, it is determined whether the vector task can run on this CPU. If it can, bit 14 of CR0 is turned on, the task's vector status is loaded from the VSSA and a "return" to FLIH occurs so that the task can be immediately redispatched (FLIH return code at block 150). When the task is to be redispatched the vector status register and vector mask register are loaded and the vector activity count (which keeps track of the amount of CPU time required for vector operations) is stored. The STCBVAFN contains the logical CPU ID to indicate vector affinity and to identify the processor whose vector registers contain the task's vector status. If the CPU does not meet the task's affinity requirements, the task is pre-empted (FLIH return code at block 155). In this case, the Dispatcher recognizes the new affinity, and the task's general registers (in the TCB), the task's PSW and the task's cross memory registers are saved. The task is pre-empted and the Dispatcher looks for another task to issue. In either case, the local lock is released at block 157.

At block 160, the Dispatcher lock is released once the task is redispatched and a "return" to (mainline) SLIH occurs at block 165. (If the local lock was not available at block 120, a local SRB is scheduled at block 170 to obtain the VSSA. Once the SRB routine is scheduled (since it runs asynchronously), a "return" to (mainline) SLIH occurs at block 165.

In FIG. 4c, the vector environment is restored for the task whose vector affinity was removed due to non-use. At block 170, restrictive affinity is restored. Since the current CPU meets the task's affinity requirements, a pointer to the VSSA is validated and a more restrictive affinity is set up in TCBAFFN. When the current CPU meets the task's affinity needs (as determined at block 173), the task is set up for redispatching (block 175). Then a "return" to (mainline) SLIH occurs at block 185. The vector control bit is turned on. The vector status register, mask register and vector registers are loaded and the vector activity count is stored. The STCBVAFN contains the logical CPU ID to indicate vector affinity and the CPU whose vector registers contain the task's vector status. If the CPU does not meet the task's affinity needs (as determined at block 173), the task's status is saved and the task is pre-empted (block 180). The Dispatcher looks for another task.

FIG. 5 is a block diagram showing several major parts of virtual storage and locations of some of the storage areas and control blocks that were discussed above. Virtual storage 20 containing a common area 22, a private area 24 and system area 26. A user's task 28 is run in an address space in virtual storage and points to the STCB (which points to the VSSA) in extended storage 30. The ASCB points to both the task in private area 24 and the ASSB in the extended system area of extended storage 30. Extended storage means storage above the high address which, in this case, is storage above 16 megabytes.

The following co-pending U.S. Patent applications contain information relevant to the invention disclosed herein:

1. U.S. patent application Ser. No. 745,040. Inventors: W. Buchholz, R. M. Smith, D. S. Wehrly.
2. U.S. patent application Ser. No. 763,167. Inventors: W. Buchholz, R. M. Smith.
3. U.S. patent application Ser. No. 544,674. Inventors: L. C. Garcia et al.

All of the above applications are assigned to the IBM Corporation. These applications, which indicate the VP hardware, the attachment of a VP to a CPU, interrupts, and the saving and restoring of the vector environment, are incorporated herein by reference.

Having thus described out invention, what we claim as new, and desire to secure by Letters Patent is:

1. In a central electronic complex including system resources, central processing units in which operating systems are run for controlling the execution of tasks, and a control bit associated with one of said system resources, a method for dynamically assigning a task to a central processing unit by an operating system only if said system resource is installed and available on said central processing unit, said method comprising:

issuing a special instruction in one of said tasks, running in one of said central processing units, said special instruction requiring for its execution use of said system resource;

continuing execution on said one of said central processing units if said control bit is on, indicating that said system resource is installed and available in said central processing unit;

detecting a special instruction operation exception which interrupts execution of said task in said one of said central processing units and which is generated when said special instruction is issued while said control bit is off indicating that said system resource is not installed or available in said one of said central processing units, said bit controlling said task's access to said system resource by indicating whether said processing unit, automatically restricting said task to only current active, on-line central processing units on which said system resource is installed and available by designating restricted CPUs on which said task may be executed in a first task-related field, said restricting being designated as restrictive affinity of said task for said CPUs, and dispatching said task on one of said restricted central processing units and turning on a control bit in said restricted central processing unit on which said task is dispatched.

2. The method of claim 1 in which said restrictive affinity of said task to said restricted CPUs is automatically removed by restoring said first task-related field to its setting prior to said restricting following a predetermined amount of time without use of said system resource by said task.

3. The method of claim 2 in which said system resources are vector processors having a plurality of possible vector status states, attached to at least one of said central processing units, and in which status information regarding said vector status states is contained in special registers associated with one of said vector processors and is saved when said task is swapped out, and is only restored when said task is dispatched with restrictive affinity on one of said restricted central processing units having one of said vector processors attached.

4. The method of claim 3 in which said restricting is accomplished by identifying each of said central processing units on which said system resource is installed by a bit set in a mask field and identifying each of the currently active, on-line central processing units to which said task is automatically restricted by a bit set in said first task-related field, said first task-related field containing the result of ANDing an original affinity setting of said field, indicating CPUs to which said task has a fixed restriction for its duration with said mask field at each dispatch.

5. The method of claim 4 in which the content of a second task-related field has a plurality of states, one of said states indicating that said special registers in said one of said vector processors contain vector status information for said task, another of said states indicating that said vector status must be restored into said registers.

6. The method of claim 5 in which said special instruction is a vector instruction and said control bit is a vector control bit in a control register which is turned on in the central processing unit on which said vector task is dispatched following a vector instruction operation exception produced by said operation exception in the central processing unit in which said vector task is running.

* * * * *